(12) United States Patent
Lundstrom et al.

(10) Patent No.: US 6,226,494 B1
(45) Date of Patent: *May 1, 2001

(54) SYSTEM AND METHOD FOR INTERMITTENT SATELLITE COMMUNICATION WITH A FIXED ANTENNA

(75) Inventors: Mark E. Lundstrom, Seattle; Amer A. Hassan, Kirkland, both of WA (US)

(73) Assignee: Teledesic LLC, Bellevue, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/935,919

(22) Filed: Sep. 23, 1997

(51) Int. Cl.⁷ .................................................. H04B 7/185

(52) U.S. Cl. .......................... 455/13.1; 455/13.3; 455/18; 342/352

(58) Field of Search ................................ 455/13.1, 13.2, 455/13.4, 12.1, 430, 429, 428, 13.3, 25, 18; 342/352

(56) References Cited

U.S. PATENT DOCUMENTS

| | | | |
|---|---|---|---|
| Re. 28,725 | * 2/1976 | Hutchinson et al. | 343/100 |
| 4,455,651 | * 6/1984 | Baran | 370/320 |
| 4,704,735 | * 11/1987 | Swapp et al. | 455/12.1 |
| 4,985,706 | * 1/1991 | Schukat | 342/352 |
| 5,408,237 | * 4/1995 | Patterson et al. | 455/13.1 |
| 5,410,728 | 4/1995 | Bertiger et al. | 455/13.1 |
| 5,455,961 | 10/1995 | Nakagawa | 455/12.1 |
| 5,678,175 | * 10/1997 | Stuart et al. | 455/13.1 |
| 5,708,963 | * 1/1998 | Mobley et al. | 455/12.1 |
| 5,722,042 | * 2/1998 | Kimura et al. | 455/13.1 |

FOREIGN PATENT DOCUMENTS

| | | | |
|---|---|---|---|
| 0 632 605 A2 | 6/1994 | (EP) | |
| 10051367 | * 8/1996 | (JP) | H04B/7/185 |
| WO 95/13671 | 5/1995 | (WO) | |
| WO 96/12356 | 4/1996 | (WO) | |

* cited by examiner

*Primary Examiner*—Edward F. Urban
*Assistant Examiner*—Tilahun Gesesse
(74) *Attorney, Agent, or Firm*—Michael J. Donohue; Seed IP Law Group PLLC

(57) ABSTRACT

A low-cost, low maintenance earth-based station is disclosed which includes a fixed aperture antenna directed to a fixed location. The system operates with a plurality of non-geosynchronous satellites that will periodically pass through a beam coverage region of the antenna. When one of the satellites comes within range of the earth-based station, the earth-based station detects the presence of the satellite and synchronizes the earth-based station with the satellite. When synchronization is complete, the earth-based station transmits stored data to the satellite. The data to be transmitted is stored within a data storage device that may be present at the earth-based station or remotely located and transmitted to the earth-based station using conventional techniques. The data may be transferred to the earth-based station from a remote data storage facility in response to a polling request after the satellite has been detected within range of the antenna, or automatically transferred from the remote storage facility and temporarily stored at the earth-based station in anticipation of the next satellite to come within range.

37 Claims, 7 Drawing Sheets

SYSTEM AND METHOD FOR INTERMITTENT SATELLITE COMMUNICATION WITH A FIXED ANTENNA

TECHNICAL FIELD

The present invention is related generally to satellite communications systems, and, more specifically, to a system and method for intermittent or discontinuous satellite communications.

BACKGROUND OF THE INVENTION

Satellites are used for a wide variety of communications ranging from telephone communication to high speed data communications. Satellite communications systems are useful alternatives to conventional terrestrial communications systems, such as land lines, fiber optic lines, microwave repeaters, and the like. A variety of satellites in various orbits are used to provide the different forms of communication. For example, it is common to use communications satellites in geostationary orbits. Such geostationary orbits require the insertion of satellites at a location approximately 22,300 miles from earth. Geostationary satellites have a circular orbit that lies in the plane of the earth's equator and turns about the polar axis of the earth in the same direction and with the same period as the rotation of the earth such that the satellite is in a fixed position relative to the surface of the earth. While being in a fixed position is an advantage, geostationary satellites are extremely expensive due to the high cost of insertion into a geostationary orbit. Furthermore, earth-based stations communicating with a geostationary satellite require high power transmission levels to effectively communicate with a satellite 22,300 miles away. In addition, transmission delays, due to the time required for radio signals to propagate up to the satellite and back to earth, are a significant problem with geostationary satellite communications systems.

To overcome the disadvantages of transmission delay associated with communications using a geostationary satellite communication system, a series of low-Earth orbit (LEO) satellites may be inserted into non-geosynchronous orbits. With a low-Earth orbit, the satellites move relative to the earth's surface. Several proposed satellite communication systems use a constellation of LEO satellites to form a network capable of communicating with an earth-based station. Because the LEO satellites move relative to the earth's surface, a conventional earth-based station for communicating with the LEO constellation must have an antenna capable of tracking each satellite as it moves overhead. With proper antenna tracking, a given earth-based station can communicate with a particular satellite for a period that depends on the altitude of each satellite. For example, as a current satellite passes out of range of an earth-based station, the earth-based station will subsequently switch to a new satellite which comes within reception range.

To accommodate such switching without interrupting data communication, the antenna for the earth-based station must quickly switch from the current satellite to the new satellite. Unfortunately, antenna designs for an earth-based station capable of switching between satellites are often complex and very expensive. For example, an electronically steerable phased array antenna may be used as the antenna for the earth-based station. The phased array antenna tracks a first satellite before quickly switching to lock onto a second satellite before the first satellite passes out of range. However, as those skilled in the art can appreciate, phased array antennas are extremely expensive.

A lower cost approach utilizes two conventional satellite dish antennas to track and switch between two satellites. A first of the two satellite dish antennas tracks the first satellite while the second antenna searches and locks onto the second satellite when it comes into range. The earth-based station then switches from the first antenna to the second antenna to allow communications with the second satellite. The first satellite dish antenna subsequently repositions itself to detect yet a third satellite that will come into range before the second satellite passes out of range of the earth-based station. Thus, the earth-based station alternates use of each antenna for communications, with the active antenna tracking the satellite currently in range while the inactive antenna searches for the next satellite that will come into range.

Although a conventional satellite dish antenna is less expensive than a phased array antenna, the use of two separate antennas increases the overall cost and complexity of the earth-based station. It can therefore be appreciated that there is a significant need for a low-cost earth-based station that can effectively communicate with low-Earth orbit satellites. The present invention offers these and other advantages, as will be apparent from the following description and accompanying figures.

SUMMARY OF THE MENTION

In a preferred embodiment, the present invention is a system that allows an earth-based station to communicate with one of a plurality of satellites in non-geostationary earth orbits. The earth-based station comprises a fixed antenna having a fixed aperture with a fixed antenna beam coverage region and aimed at a fixed position in space. The earth-based station also includes a satellite detection system to detect when one of the plurality of satellites passes through the antenna beam coverage region. A receiver coupled to the antenna receives radio transmissions from the detected satellite when the satellite passes through the antenna beam coverage region. The earth-based station also includes a data storage area to store data for transmission to the detected satellite and a transmitter coupled to the antenna to transmit the stored data to the detected satellite when the satellite passes through the antenna beam coverage region. In this manner, the receiver and transmitter communicate with the detected satellite when the detected satellite is within the antenna beam coverage region.

In one embodiment, the satellite detection system includes the receiver and detects a satellite within the antenna beam coverage region based on a signal strength value indicative of the strength of the received radio transmissions. In another embodiment, the satellite detection system includes an orbital data storage area containing orbital data indicative of satellite orbital positions of the plurality of satellites. Based on the orbital data, the satellite detection system determines when a satellite is within the antenna beam coverage region.

The earth-based station may also include a data input device to generate data for storage in the data storage area and later transmission to a satellite after the satellite is detected within the antenna beam coverage region. The data input device can transmit additional data to the detected satellite in real time while the detected satellite is within the antenna beam coverage region.

The earth-based station may also include a polling request system to transmit a polling request to a detected satellite. The satellite responds to the reception of the polling request by transmitting data from the satellite to the receiver. In one embodiment, the overall satellite communications system includes a central data storage area to store data intended for the earth-based station. The central data storage area communicates with the detected satellite and, in response to the polling request, transmits the stored data from the central data storage area to the earth-based station via the detected satellite.

The disclosed system permits an earth-based station to maintain intermittent or discontinuous communications with a plurality of satellites in non-geostationary orbits. When a detected satellite moves out of the antenna beam coverage region, the earth-based station terminates communication with the detected satellite. When the satellite detection system detects a subsequent one of the plurality of satellites passing through the antenna beam coverage region it permits communication between the earth-based station and the subsequent satellite. In this manner, the earth-based station can communicate with each of the plurality of satellites as each satellite passes through the antenna beam coverage region. The receiver and transmitter communicate with each of the plurality of satellites when the satellite is within the antenna beam coverage region and do not communicate when there is no satellite within the antenna beam coverage region.

DETAILED DESCRIPTION OF THE INVENTION

Figure 1A:
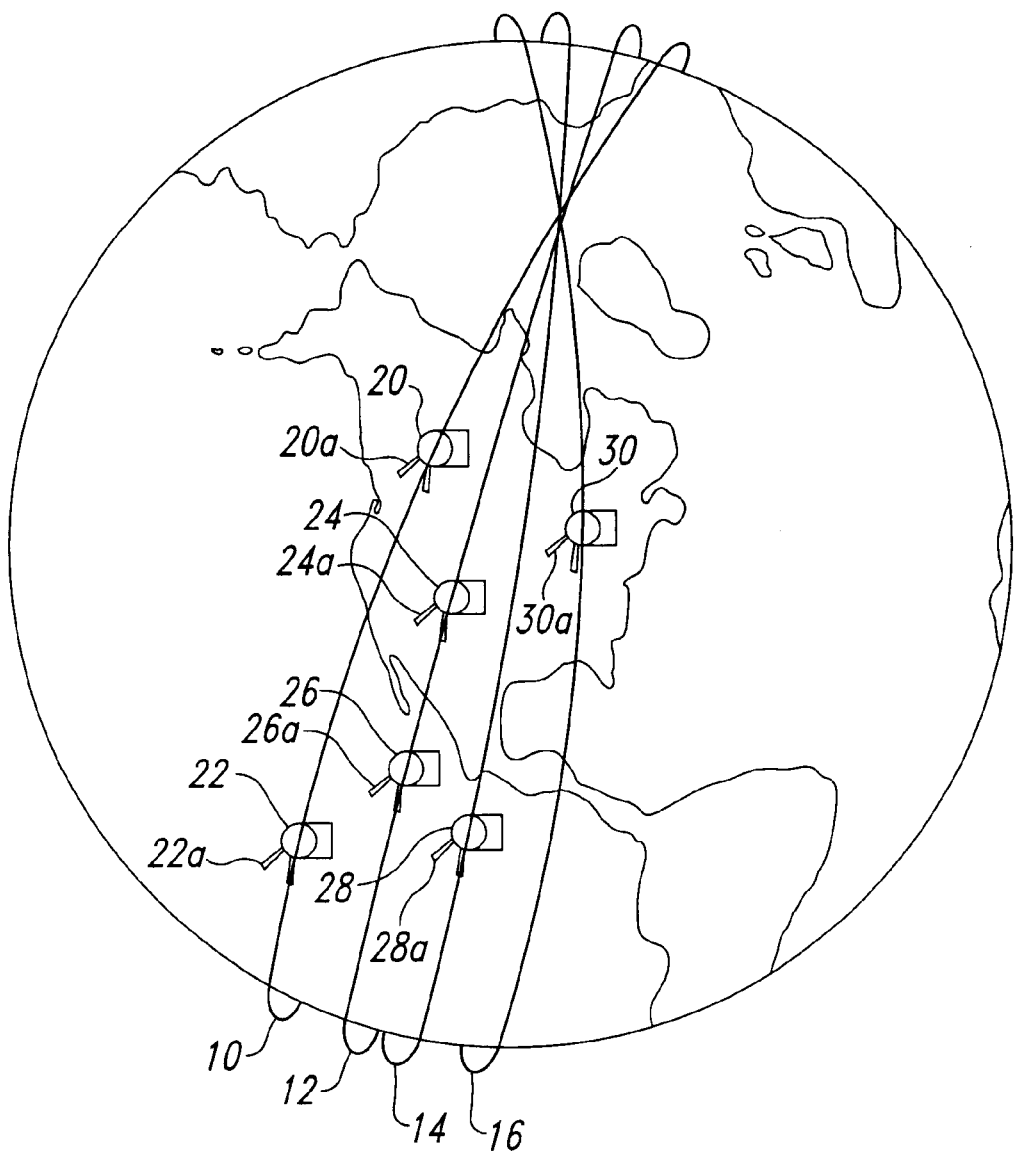
FIG. 1A illustrates the earth and four near polar low-Earth orbital planes containing orbiting satellites.

FIG. 1A illustrates the operation of a representative satellite communications system consisting of a constellation of satellites in low-Earth orbit (LEO). In a conventional LEO satellite system each orbital plane contains one or more orbiting satellites, each having a multi-element directional antenna array, such as described in U.S. Pat. No. 5,642,122, which is assigned to the assignee of the present invention and which is incorporated by reference in its entirety. For the sake of clarity, FIG. 1A illustrates only four orbital planes with a small number of satellites. As illustrated in FIG. 1A, orbital planes 10, 12, 14, and 16 each contain one or more satellites in a near polar low-Earth orbit. The orbital plane 10 contains a satellite 20 with antenna 20a and a satellite 22 with antenna 22a. The adjacent orbital plane 12 contains a satellite 24 with antenna 24a and a satellite 26 with antenna 26a. The orbital plane 14 contains a satellite 28 with antenna 28a while the orbital plane 16 contains a satellite 30 with antenna 30a. For the sake of the present discussion, it is assumed that the satellites 20–30 are all portions of a common satellite communications system.

Figure 1B:
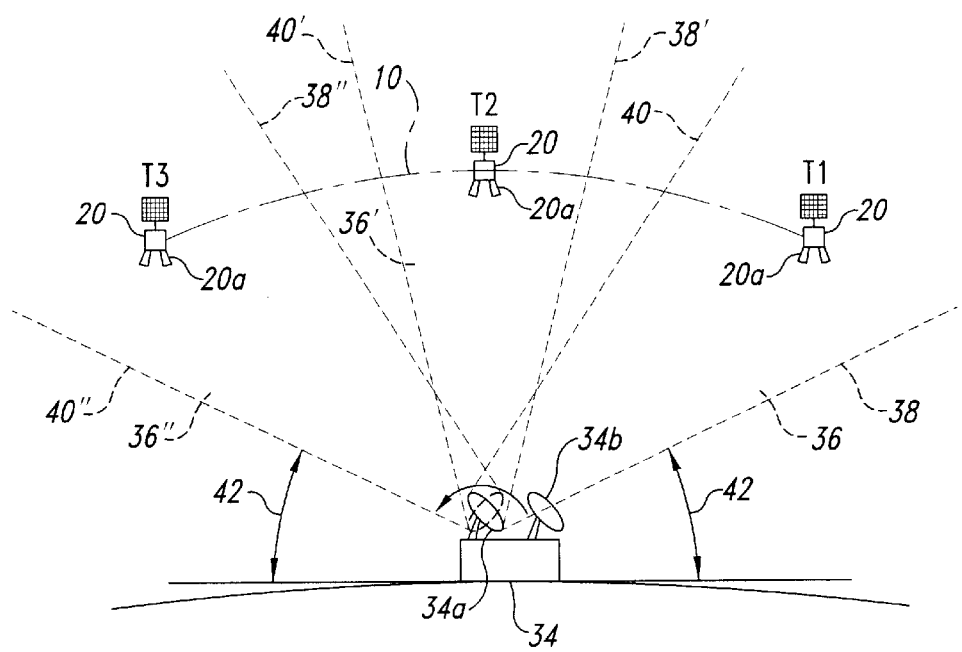
FIG. 1B illustrates the operation of a conventional earth-based station in tracking and communicating with a satellite in one of the four low-Earth orbital planes of FIG. 1A.

FIG. 1B depicts the satellite 20 in the orbital plane 10 as it communicates with an earth-based station 34 of the prior art. The earth-based station 34 has an antenna 34a, which is illustrated in FIG. 1B as a dish antenna. However, the antenna 34a could also be implemented using phased-array antenna technology. The antenna 34a has a beam width 36, which is illustrated in FIG. 1B by the dashed boundary lines 38 and 40. Although not illustrated in FIG. 1B, the beam width 36 is a three-dimensional volume that is roughly conical in shape. The earth-based station 34 is capable of communicating with any satellite that falls within the beam width 36. As illustrated in FIG. 1B, the satellite 20 in the orbital plane 10 is within the beam width 36 at a given time, designated in FIG. 1B as T1. As the satellite 20 moves along the orbital plane 10, the antenna 34a is moved to track the satellite and maintain the satellite within the beam width 36. As previously discussed, the antenna 34a may be electronically steered, if the antenna is a phased-array antenna, or mechanically steered if the antenna is a conventional dish antenna. As the satellite 20 moves along the orbital plane 10 it reaches a location at a different point in time, designated as T2. At time T2, the antenna 34a is oriented so as to maintain the satellite within the beam width 36' whose boundaries are indicated by the dashed lines 38' and 40'. The beam width 36' in FIG. 1B is simply the beam width 36 at a subsequent point in time (i.e., T2). As the satellite 20 continues its movement in the orbital plane 10, the antenna 34a continues to track the satellite. At a subsequent point in time, designated as T3, the satellite 20 is maintained within the beam width 36" whose boundaries are indicated by the dashed lines 38" and 40". Thus, the earth-based station 34 can maintain continuous communications with the satellite 20 at any point in time from T1 to T3.

It should be noted that the earth-based station 34 cannot communicate with any satellite that is below an antenna mask angle, which is illustrated in FIG. 1B by the reference numeral 42. The mask angle 42 is defined as the angle between the local horizon of the earth-based station 34 and the lowest point of the aperture at which the satellite 20 may be detected by the earth-based station 34, illustrated by the dashed line 38 (and the dashed line 40"). Thus, the earth-based station 34 can communicate with the satellite 20, or any other satellite, so long as the satellite is above the mask angle 42 and within the beam width 36.

As previously discussed, the disadvantage of the system illustrated in FIGS. 1A and 1B is the high cost of the antenna 34a to track the satellite 20a. Because satellites in a LEO constellation move with respect to a fixed position on the earth, each satellite is only within communication range of an earth-based station for a short period of time. For example, in a particular embodiment of the system having 288 satellites orbiting at 1350 kilometers and with 40° mask angle, a particular satellite can only communicate with the earth based station 34 for approximately 4 minutes. After that time, the earth-based station 34 must acquire a new satellite. As previously discussed, acquiring a new satellite requires a second dish antenna 34b or the antenna 34a must be an expensive phased-array antenna in order to maintain continuous contact with the satellites in a LEO constellation.

The present invention is directed to an earth-based station that is capable of intermittent or discontinuous satellite communications. The earth-based station of the present invention uses a low-cost fixed antenna and stores data until a LEO satellite passes through the beam coverage of the antenna. The earth-based station detects the satellite passing within the beam coverage of the low cost antenna and automatically transmits data to and receives data from the satellite as the satellite passes through the antenna beam coverage region. The use of a fixed antenna eliminates the need for antenna alignment and allows the earth-based station to be set up by the ordinary consumer. The low cost and small size of the earth-based station allows the station be readily transported from one location to another. Thus, the earth-based station of the present invention can be purchased as a consumer product and installed and used by an ordinary consumer, and easily moved from one location to another. The use of a fixed antenna also provides a low-cost alternative to the earth-based station 34 and eliminates the need for the phased-array antenna or mechanically steerable dish antennas 34a and 34b. The present invention preferably uses a single dish antenna and therefore significantly reduces the cost of the earth-based station.

Figure 2:
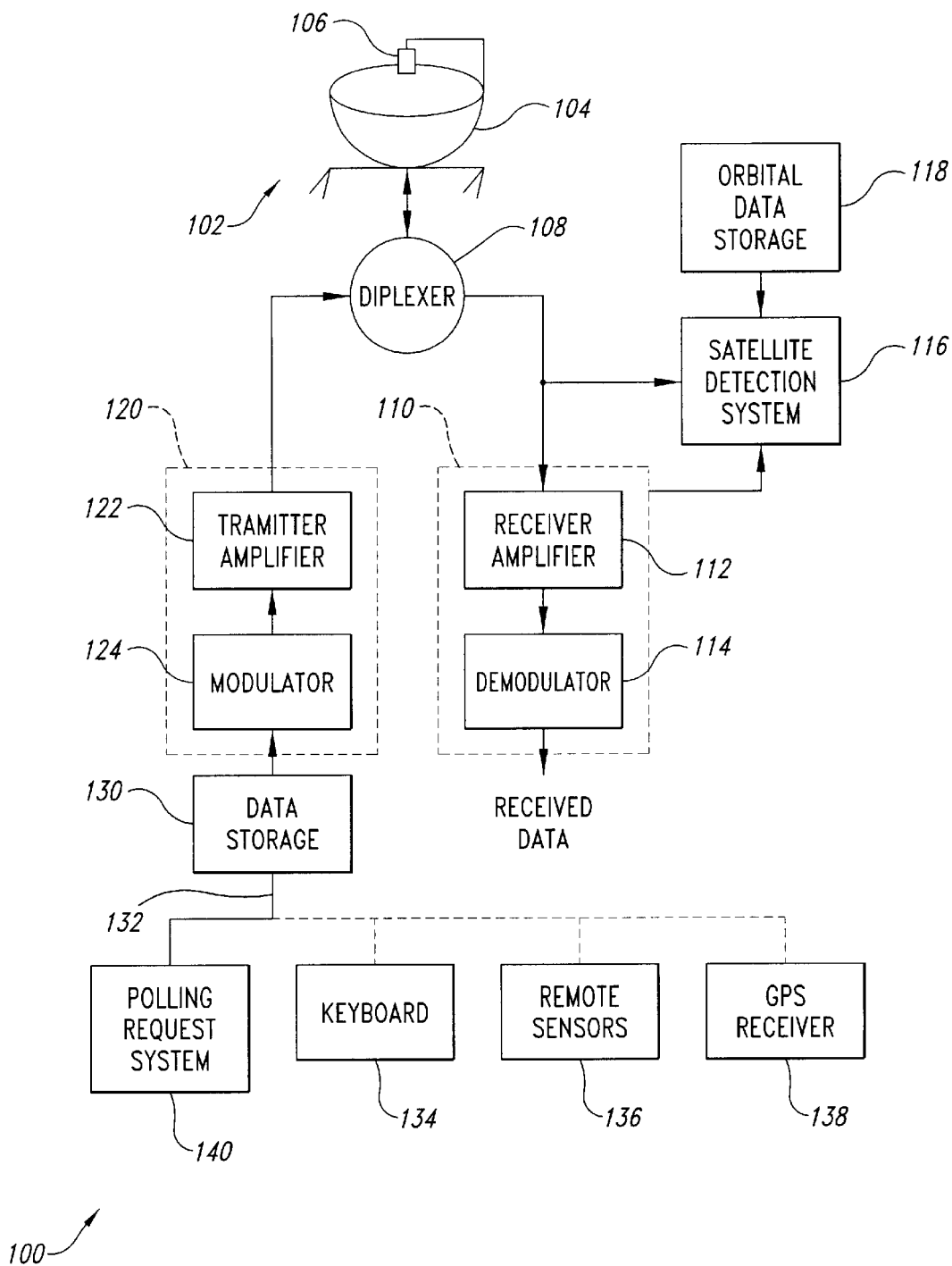
FIG. 2 is a functional block diagram of the earth-based station of the system of the present invention.

The present invention is embodied in a system 100 illustrated in the functional block diagram of FIG. 2 operable with a plurality of LEO satellites. The system 100 includes an antenna 102 with a parabolic reflector 104 and a horn antenna 106. As will be described in greater detail below, the antenna 102 is a preferably low-cost, fixed aperture antenna with a fixed antenna beam coverage region aimed at a fixed location in the sky and capable of communications with any satellite that falls within its aperture.

The system 100 includes a diplexer 108 or any suitable antenna splitter, which allows the antenna 102 to be used for both transmission and reception of satellite signals. The diplexer 108 is coupled to a satellite receiver 110. The receiver 110 typically includes a receiver amplifier 112 and a demodulator 114. The receiver amplifier 112 is coupled to the diplexer 108 and receives radio frequency (RF) signals from the satellite, which are detected by the antenna 102. The specific form of the receiver amplifier 112 and the demodulator 114 depend on the specific modulation techniques used by the satellite. However, the overall operation of the receiver 110 is well known to those of ordinary skill in the art and need not be described in greater detail herein.

In an exemplary embodiment, a satellite detection system 116 determines when a satellite is within range of the system 100. The term "in range" refers to the ability of the system 100 to communicate with the satellite. In one embodiment, the satellite detection system 116 monitors the strength of a signal received by the receiver 110. When no satellite is within range, the signal strength from the receiver is low. As a satellite moves into range, the signal strength detected by the receiver 110 increases. The satellite detection system 116 monitors the signal strength until the signal strength from the receiver 110 exceeds a predetermined threshold. A signal strength value above the predetermined threshold indicates that a satellite is within range of the system 100.

In another exemplary embodiment, the system 100 includes an orbital data storage area 118, which may be a memory device, a disk drive, or other suitable data storage device. The orbital data storage area 118 contains detailed orbital information about each of the plurality of LEO satellites. Based on information within the orbital data storage area 118, the system 100 can determine the precise time at which a satellite will come into range of the system. A combination of these two techniques may also be used. For example, the orbital data storage area 118 may provide information to indicate the approximate time at which a satellite will come into range. At that point in time, the satellite detection system 116 begins to monitor the signal strength from the receiver 110 to determine when the satellite is actually within range. Periodically, the orbital information in the orbital data storage area 118 may be updated with data transmitted from satellites in the LEO constellation.

The system 100 also includes a transmitter 120, which comprises a transmitter amplifier 122 and a modulator 124. The transmitter amplifier 122 is coupled to the diplexer 108 and couples data from the transmitter amplifier to the antenna 102 for transmission to a satellite. The specific form of the transmitter amplifier 122 and the modulator 124 depend on the particular transmission techniques used for communication with the satellites. However, the overall operation of the transmitter 120 is well known to those of ordinary skill in the art and need not be described in greater detail herein.

The system 100 also includes a data storage device 130, which may be a memory device, a disk drive, or any other suitable data storage device. The data storage device 130 stores data to be transmitted through the satellite network until the system 100 establishes contact with one of the satellites. When contact with a satellite is established, the data stored within the data storage device 130 is automatically transmitted to the satellite using the transmitter 120. The data storage device 130 can contain any form of data having a delivery requirement that is relatively time insensitive, such as electronic mail (E-mail), position data, remote sensing data, and the like. The present invention, however, is not limited by the specific form of the transmitted or received data.

Data is provided to the data storage device 130 on a data input line 32. The data input line 132 is a conventional input connection whose specific configuration depends on the nature of the device generating the data. For example, the system may include a keyboard 134 to enter data such as E-mail. In this exemplary embodiment, the system 100 may include a computer (not shown). The data storage device 130, data input line 132, and keyboard 134 may be located with the other portions of the system 100 or may be portions of the computer. Data may be coupled to the modulator 124 via a conventional computer interface, such as an RS-232 serial interface, a computer network connection, or the like. The use of the keyboard 134 to generate data is well known to those of ordinary skill in the art and need not be described in greater detail herein.

Other forms of input devices include remote sensors 136 and a global positioning system (GPS) receiver 138. The remote sensors 136 can be any form of conventional sensor, such as security sensors, atmospheric sensors, geologic sensors, hydrologic sensors or the like. The system 100 is particularly advantageous for remote sensing operations such as, by way of example, a remote weather station where various sensors are used to collect temperature data, wind speed data, rainfall data, and other forms of atmospheric data, which are stored within the data storage device 130 and need not be continuously transmitted to a satellite. When a satellite passes within range of the system 100, the atmospheric data is transmitted to the satellite using the transmitter 120 and the antenna 102.

The system 100 is also extremely useful in resource monitoring using, by way of example, the GPS receiver 138. The system 100 may be installed, for example, on a ship. The GPS receiver 138 periodically generates position data using conventional techniques, with the position data being stored in the data storage device 130. When a satellite passes within range of the system 100, the position data is transmitted to the satellite using the transmitter 120 and antenna 102. Thus, the system 100 has great applicability for any situation in which the delivery of the stored data is not time sensitive.

The system 100 also permits two-way communication with the satellite. The operation of the transmitter 120 has been previously described. In the preferred embodiment of the satellite communications system, the earth-based station receives a beacon signal transmitted from the satellite, and uses the beacon signal to synchronize the earth-based station with the satellite. However, other forms of data may also be transmitted by the satellite to the earth-based station. The system 100 of the present invention includes a polling request system 140 that transmits a polling request signal from the earth-based station to the satellite when in range of the system 100. The polling request signal is a request by the earth-based station for the satellite to transmit any data that is intended for that earth-based station. The operation of polling signals is well understood, and need not be described in greater detail herein. The received data may include updated orbital position information, user messages, or system messages.

A significant cost savings is achieved by the system 100 through the use of the low-cost antenna 102. The parabolic reflector 104 is preferably approximately 12 inches in diameter. The horn antenna 106 is attached to one edge of the parabolic reflector 104 so that the horn antenna is positioned substantially at the focal point of the parabolic reflector. The antenna 102 provides 29 dB of gain compared with a conventional isotropic radiator (i.e., 29 dBi). In operation, the antenna 102 is aimed at a zenith location such that the antenna has a 90° elevation angle. As used herein, the terms "elevation" and "azimuth" refer to two dimensions in which the antenna is aimed. The elevation refers to the angle formed between the satellite and a plane tangential to the earth at the location of the earth-based station. The elevation angle ranges between 0 and 90°. The azimuth is the angle formed between true north and a perpendicular to the satellite in a plane tangential to the earth at the location of the earth based station. The azimuth ranges between 0 and 3600. In simplistic terms, elevation may be thought of as the "up and down" direction of the antenna, while azimuth may be thought of as the "back and forth" direction of the antenna.

Figure 3A:
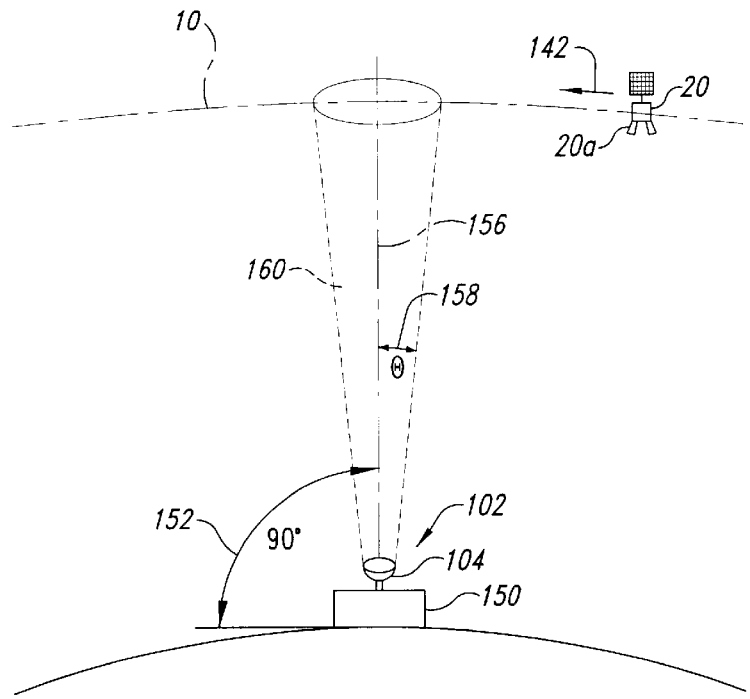
FIG. 3A illustrates the operation of the system of FIG. 2 with no satellite currently in detection range of the earth-based station.
Figure 3B:
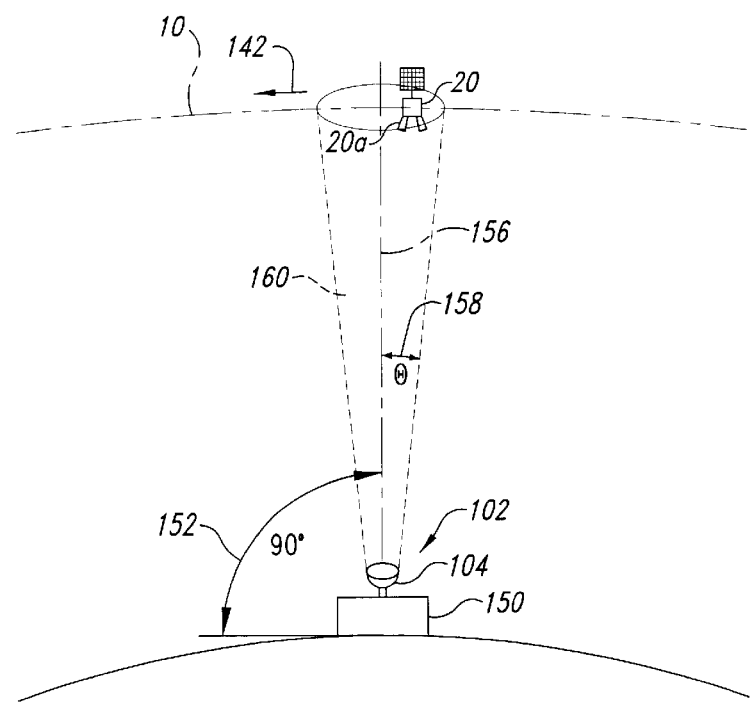
FIG. 3B illustrates the operation of the system of FIG. 2 when a satellite has moved into detection range of the earth-based station.
Figure 3C:
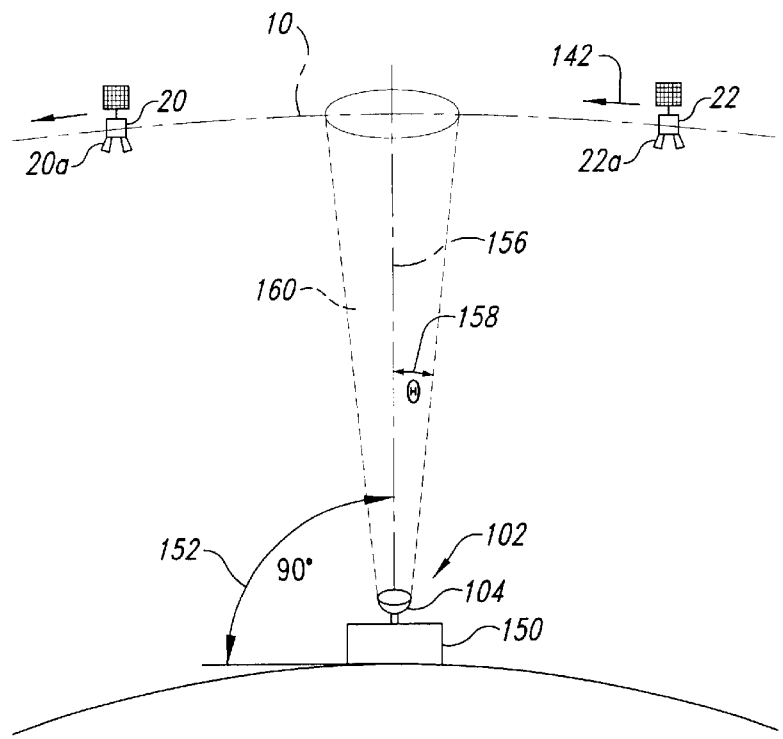
FIG. 3C illustrates the operation of the system of FIG. 2 with no satellite currently in detection range of the earth-based station.

FIGS. 3A to 3C illustrate the beam width of the antenna 102 and the operation of the system 100. The direction of satellite movement in the orbital plane 10 is shown in FIGS. 3A to 3C by an arrow 142. An earth-based station 150 is constructed in accordance with the principles of the present invention. The parabolic reflector 104 of the antenna 102 is preferably aimed directly overhead thus forming an elevation angle 152 of approximately 90°. The antenna 102 is fixed and does not move in the azimuth or elevation. As illustrated in FIG. 3A, a beam center 156 of the antenna 102 is aimed directly overhead. The antenna 102 has a beam width 158 of approximately 6° thus forming a fixed upward projecting antenna beam 160 of 12°. As is known to those of ordinary skill in the art, the "beam width" refers to the angle formed between the beam center and the point at which the antenna gain is at one-half its maximum gain. It should be noted that the satellite 20 need not be within the antenna beam 160 to be detected by the system 100. The system 100 can detect the presence of the satellite 20 and communicate with the satellite outside the beam 160 even though the antenna gain may be less than one-half the maximum gain. The only requirement is that the system 100 must have sufficient signal strength to allow communications between the satellite and the earth-based station. The term "antenna beam coverage region" is used herein to define the region or zone of antenna coverage in which the signal strength is sufficient to permit the earth-based station to communicate with a satellite.

Although the antenna 102 is illustrated in FIG. 3A as directed to its zenith position, the principles of the present invention can be readily applied to a fixed antenna having an elevational angle other than 90°. For example the antenna could have an elevation angle of 60° to detect satellites lower on the horizon and avoid obstacles near the earth-based station. As those of ordinary skill in the art can appreciate, the orientation of the antenna 102 in the zenith position results in a minimum slant range, while the slant range increases as the elevational angle is decreased. Accordingly, the zenith position is the preferred position for the antenna 102

FIG. 3A also illustrates the orbital plane 10 and satellite 20. As seen in FIG. 3A, the satellite 20 at its illustrated position is far outside the antenna beam 160. Thus, the earth-based station 150 cannot communicate with the satellite 20 because the satellite is not within range of the earth-based station. The satellite 20 may be deemed to be "in range" of the system 100 when the satellite is within the antenna beam coverage region of the antenna 102. When the satellite 20 is not within range of the earth-based station 150, data to be transmitted when the satellite is within range is accumulated and stored within the data storage device 130, as previously described.

FIG. 3B illustrates the operation of the system 100 when the satellite 20 moves within the antenna beam 160. During the brief period of time in which the satellite 20 is within the antenna beam coverage region (approximately 20 seconds in the preferred constellation described above), the earth-based station 150 receives a synchronization signal from the satellite 20 and transmits data stored within the data storage device 130 (see FIG. 2). As previously discussed, the synchronization between the satellite 20 and the earth-based station 150 is preferably performed using the beacon signal from the satellite. Other techniques to synchronize transmissions between the earth-based station 150 and the satellite 20 are well known in the art, and need not be described herein.

The earth-based station can only communicate with the satellite 20 while it is in range (ie., within the antenna beam coverage region). If all data within the data storage device 130 (see FIG. 2) is not transmitted while the satellite 20 is within range, the system 100 retains the untransmitted data within the data storage device for transmission when a different satellite later comes into range. However, if all data within the data storage device 130 is transmitted while the satellite 20 is within range, the system 100 can transmit additional data to the satellite in real time, without the need for storing data within the data storage device. For example, data from the remote sensors 136 (see FIG. 2) or the GPS receiver 138 can continue to transmit data directly to the satellite 20 without the need for temporary storage in the data storage device 130 so long as all stored data has first been transmitted and the satellite is still within range. Alternatively, the system 100 can accommodate data priority labels such that data with higher priority is transmitted first. In this embodiment, it is possible for real time data to be transmitted prior to the transmission of data in the data storage device 130 if the real time data has a higher priority designation.

FIG. 3C illustrates the movement of the satellite 20 beyond the range of the system 100 because the satellite is no longer within the antenna beam coverage region of the antenna 102. At this point in time, the earth-based station 150 is momentarily out of communication with any satellite. However, the satellite 22, also in the orbital plane 10, will soon come into range within the antenna beam coverage region of the antenna 102. Thus, the system 100 is capable of intermittent or discontinuous communications with a plurality of satellites as each satellite passes within the antenna beam coverage region of the antenna 102.

In one proposed satellite communications system a large number of LEO satellites are placed in a series of near polar low-Earth orbital planes. Such a system is described in PCT Patent Application No. PCT/US92/08966 Satellite Communication System," published on May 13, 1993 (Publication No. WO 93/09613), which is incorporated herein by reference in its entirety. The satellite communication system proposed in the above-referenced application uses a series of satellites inserted into low-Earth orbits at approximately 700 kilometers to provide nearly continuous high-speed data communication from any point on earth. The plurality of low-Earth orbit satellites in this proposed system have overlapping areas of coverage on the surface of the earth. With the proposed system, a conventional earth-based station 34 (see FIG. 1B) with antenna tracking capability is expected to have a satellite communication link available 99.9% of the time. However, the system 100 of the present invention, using the low-cost fixed antenna 102, is expected to have satellite link availability approximately 99.3% of the time when the satellite communication system is fully implemented. Thus, the system 100 can provide highly reliable intermittent satellite communication with high link availability when communicating with satellites in a system such as described in the above-referenced PCT application. Even without a large-scale satellite deployment, e.g., during the initial partial deployment of a constellation, the system 100 is capable of testing for the presence of a satellite within the antenna beam coverage region of the antenna 102 and communicating with any satellite that comes within range of the system. Thus, the principles of the present invention are applicable to any non-geostationary satellite system, although the number of satellites and link availability may vary depending on the number and deployment of satellites in the constellation.

The presence of a satellite within the antenna beam coverage region of the antenna 102 can be detected by a number of different techniques. The satellite detection system 116 (see FIG. 2) of the earth-based station 150 may include the orbital data storage area 118 (see FIG. 2), which has detailed orbital information regarding the satellites expected to pass within range in the antenna beam coverage region of the antenna 102. If such detailed orbital information is available, the earth-based station 150 may simply wait until the satellite 20 is known to be within the antenna beam coverage region based on the orbital information. When the satellite 20 is expected to be within range, the earth-based station activates and synchronizes its own transmission so as to arrive at the satellite 20 at the appropriate time. Alternatively, the earth-based station 150 may not have detailed orbital information. In that event, the satellite detection system 116 uses the receiver 110 to perform periodic signal strength measurements to detect a beacon or other signal from the satellite 20. When no satellite is within range, the signal strength will be negligible. As the satellite 20 passes through the antenna beam coverage region of the antenna 102 (see FIG. 3B), there is a significant increase in detected signal strength. The increase in signal strength above a predetermined threshold value indicates that the satellite 20 is within range, (ie., in the antenna beam coverage region of the antenna 102). At that time, the earth-based station 150 synchronizes its transmission to the satellite so that data within the data storage device 130 can be transmitted to the satellite at the appropriate time.

Figure 4:
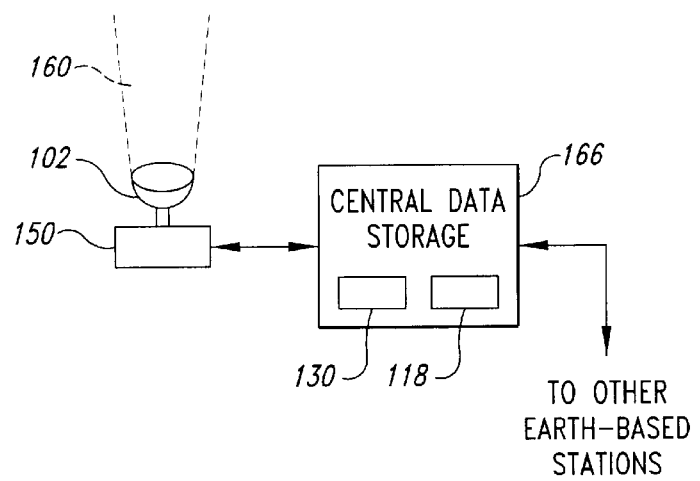
FIG. 4 illustrates the use of a central data storage facility by the system of FIG. 2.

FIG. 2 illustrates the system 100 with the data storage device 130 coupled directly to the modulator 124. However, as previously discussed, the data storage device 130 may be part of a computer system (not shown) and coupled to the modulator via a conventional connection, such as a network connection. In the embodiment illustrated in FIG. 4, the data storage device 130 may be in a central data storage facility 166 remote from the earth-based station 150. The data may be forwarded from the central data storage facility 166 to the modulator 124, or a temporary buffer (not shown) before the satellite 20 passes through the antenna beam coverage region of the antenna 102. Alternatively, the system 100 may wait until the satellite 20 passes through the antenna beam coverage region of the antenna 102 (see FIG. 3B) and transmits a polling signal to request delivery of any data to be transmitted to the satellite. The central data storage facility 166 can provide data storage capability for a plurality of earth-based stations and forward stored data to the modulator 124 of each earth-based station only upon the polling request.

It should be noted that, while the present description illustrates only a single earth-based station, the process described above can occur for other earth-based stations in the same general geographic area and subsequently for other earth-based stations as the satellite travels along its orbit. In addition, the data input line 132 may receive data from multiple users for storage in the data store device 130. Thus, although the earth-based station can be easily purchased by an individual consumer, a single earth-based station may be connected to multiple users.

In another alternative embodiment, the orbital data storage area 118 may be located in the central data storage facility 166 and contain detailed orbital information of the constellation relative to a number of earth-based stations. The central data storage facility 166 uses the orbital data and automatically forwards data from the data storage device 130 to a particular earth-based station just as a satellite moves into range of that earth-based station.

Figure 5:
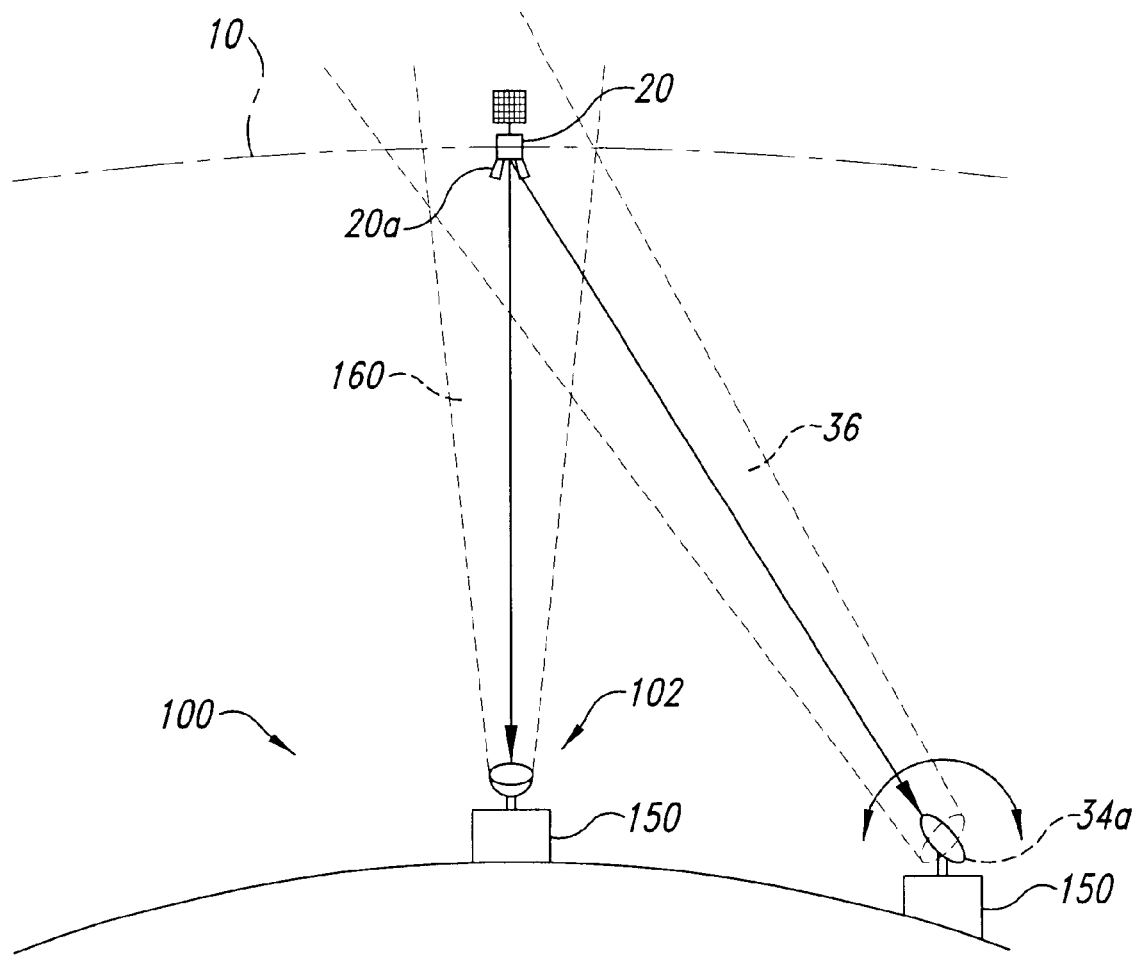
FIG. 5 illustrates the use of a satellite relay link between multiple earth-based stations of the present invention.

The system 100 may also be used to forward data from the central data storage facility 166 to the earth-based station 150 using the satellite 20 as a relay link. This embodiment is illustrated in FIG. 5 where the central data storage facility 166 includes an earth-based station having a conventional satellite tracking antenna 34a. As illustrated in FIG. 5, the satellite 20 is within the beam width 36 of the antenna 34a and is also within the antenna beam coverage region of the antenna 102. When the satellite 20 moves within the range of the earth-based station 150, the transmitter 110 (see FIG. 2) transmits any stored data in the manner previously described. In addition, the polling request system 140 transmits a polling request to the satellite 20, which relays the polling request to the central data storage facility 166. In response to the polling request, the central storage facility 166 transmits to the satellite 20 any data intended for the earth-based station 150. The satellite 20 relays the data received from the central data storage facility 166 to the earth-based station 150.

FIG. 5 illustrates the operation of the system 100 when the satellite 20 is within the beam width 36 of the antenna 34a and the antenna beam coverage region of the antenna 102. The satellite 20 can relay data between the central data storage facility 166 and the earth-based station 150 while the satellite is simultaneously within the beam width 36 of the central data storage facility 166 and the antenna beam coverage region of the antenna 102. In an alternative embodiment, the satellite 20 may initially pass through the beam width 36 of the antenna 34a and receive any data which is stored within the central data storage facility 166 and is intended for the earth-based station 150. The satellite 20 temporarily stores the received data and passes out of range of the antenna 34a of the central data storage facility 166. When the satellite 20 subsequently comes into the range of the earth-based station 150, the satellite relays to the earth-based station the stored data that was previously received from the central data storage facility 166.

Figure 6:
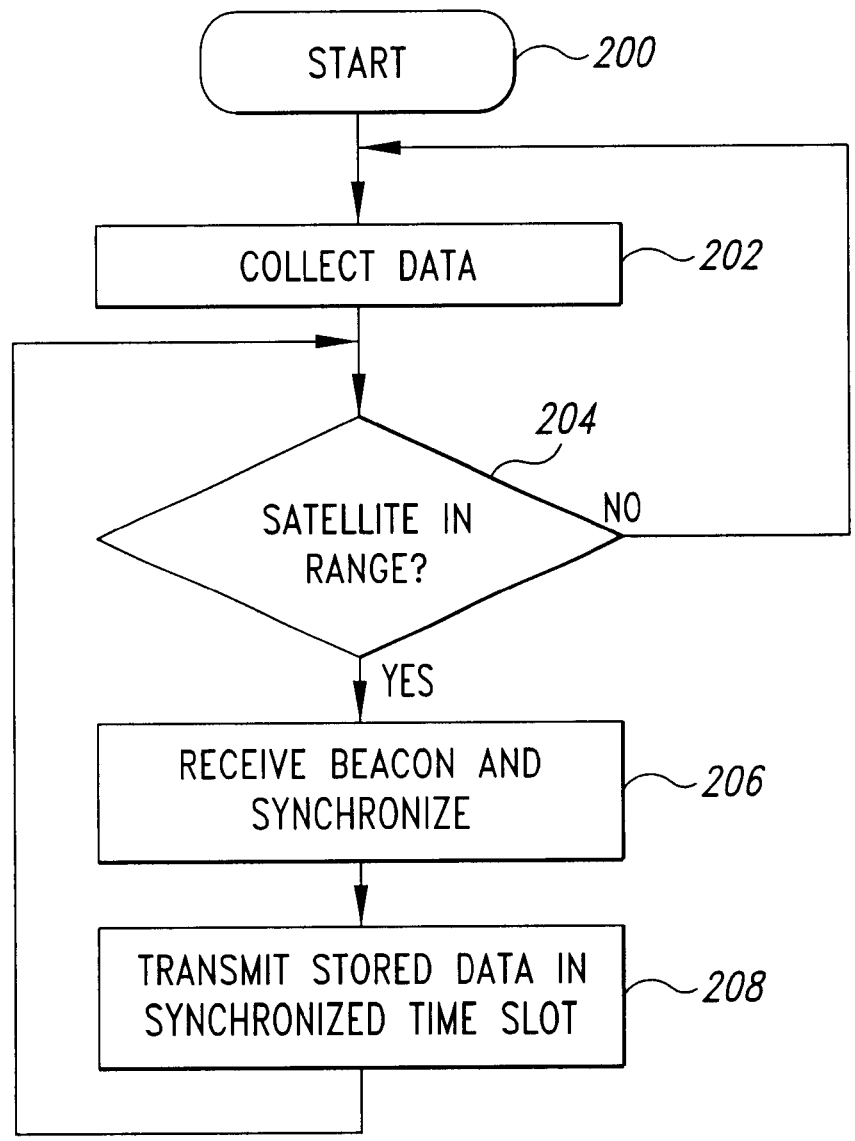
FIG. 6 is a flowchart illustrating the operation of the system of FIG. 2.

The techniques used by the system 100 are illustrated in the flowchart of FIG. 6. At a start 200, the earth-based station 150 (see FIGS. 3A–3C) has power. In step 202, the system 100 collects and stores data in the data storage system 30 from any suitable data source for later transmission to one of the satellites such as described above. In decision 204, the system 100 determines whether a satellite falls within the antenna beam coverage region of the antenna 102 (see FIG. 3B). As noted above, the system 100 can determine whether a satellite is within range using predetermined orbital information or by making periodic signal strength measurements to detect the satellite beacon signal. If detailed orbital information is available in the orbital data storage area 118 (see FIG. 2), the satellite detection system 116 simply waits until the satellite 20 is known to be within the antenna beam coverage region (see FIG. 3B) of the antenna 102. Alternatively, the satellite detection system 116 may use the receiver 110 to perform periodic signal strength measurements to detect the beacon signal from the satellite 20. A previously discussed, when no satellite is within range, the signal strength value will be negligible. As the satellite 20 passes into range within the antenna beam coverage region of the antenna 102, there is a significant increase in the signal strength.

In the event that the satellite is not within range, the system 100 returns to step 202 and continues to collect and store data within the data storage device 130 (see FIG. 2). If the satellite 20 is within range, at step 206, the system 100 receives the satellite beacon signal and synchronizes the earth-based station 150 (see FIG. 3B) for proper operation with the satellite 20.

In step 208, the earth-based station 150 transmits stored data in the data storage device 130 in a synchronized fashion that is well known in the field of satellite communications. In an exemplary embodiment, the earth-based station 150 transmits packets of data in a synchronized time slot. The time slot synchronization between the earth-based station 150 and the satellite 20 is well known, and need not be described herein. Following transmission of stored data in step 208, the system returns to decision 204 to determine whether the satellite 20 is still within range. If the satellite 20 is still within range, the earth-based station 150 continues to transmit any previously untransmitted data stored in the data storage device 130 (see FIG. 2). When the satellite 20 has moved out of range, as illustrated in FIG. 3C, the system 100 returns to step 202 and resumes the collection and storage of data in the data storage device 130 until the next satellite comes into range of the earth-based station.

The system 100 provides intermittent or discontinuous satellite communication, but at a significantly lower cost than earth-based stations that are presently available for low-Earth orbit systems. The fixed antenna 102 is low-cost and requires virtually no maintenance as compared with a tracking dish antenna that has moving parts. The fixed antenna 102 also offers a significant cost savings over a phased array antenna. It will be appreciated, however, that other more expensive antenna designs (including phased array antennas) would be equally effective in the system.

From the foregoing it will be appreciated that, although specific embodiments of the invention have been described herein for purposes of illustration, various modifications may be made without deviating from the spirit and scope of the invention. For example, the principles of the present invention are applicable to any form of the satellite receiver 110 and transmitter 120 (see FIG. 2). In addition, the principles of the present invention are applicable to any non-geostationary (non-GSO) satellite system, such as a medium earth orbit system, where satellite coverage of a particular location on the earth is intermittent. Accordingly, the present invention is not limited except as by the appended claims.

What is claimed is:

1. A satellite communication system, comprising:
   a plurality of satellites in non-geostationary earth orbit in one or more predetermined orbital planes and distributed in an arrangement with distances between satellites sufficient such that, at times, all satellites are out of range of an antenna beam coverage region of a non-tracking antenna of an earth-based station; and
   an earth-based satellite communication station to establish a temporary communication link with the plurality of satellites wherein the earth-based station is initially out of communication with the plurality of satellites, the earth-based station comprising:
      a data storage area to collect and temporarily store data for subsequent transmission to a detected one of the plurality of satellites;
      a non-tracking directional antenna having a fixed aperture with an antenna beam coverage region and positioned at a fixed azimuth and elevation;
      a satellite detection system to detect when one of the plurality of satellites passes through the antenna beam coverage region, the satellite detection system generating an indicator that one of the plurality of satellites has been detected within the antenna beam coverage region;
      a receiver coupled to the antenna to receive radio transmissions from the detected satellite when the satellite passes through the antenna beam coverage region; and
      a transmitter coupled to the antenna to transmit the stored data to the detected satellite when the satellite passes through the antenna beam coverage region, the receiver and transmitter communicating with the detected satellite while the detected satellite is within the antenna beam coverage region and not communicating with any of the plurality of satellites when the detected satellite passes out of the antenna beam coverage region, such that the temporary communication link between the earth-based station and the plurality of satellites is terminated until the satellite detection system subsequently detects when one of the plurality of satellites passes through the antenna beam coverage region.

2. The system of claim 1 wherein the satellite detection system is coupled to the receiver and detects the satellite within the antenna beam coverage region based on a signal strength value indicative of the strength of the received radio transmissions.

3. The system of claim 1, further including an orbital data storage area containing orbital data indicative of satellite orbital positions of the plurality of satellites wherein the satellite detection system determines when the detected satellite is within the antenna beam coverage region based on the orbital data.

4. The system of claim 1, further including a data input device to generate data for storage in the data storage area.

5. The system of claim 1, further including a data input device to generate additional data for transmission by the transmitter to the detected satellite in real-time while the detected satellite is within the antenna beam coverage region.

6. The system of claim 1, further including a polling request system within the earth-based station transmitting a polling request to the detected satellite using the transmitter, and wherein the detected satellite, in response to reception of the polling request, transmits data from the satellite to the receiver.

7. The system of claim 6, further including a central data storage area to store data for subsequent transmission to the earth-based station, the central data storage area communicating with the detected satellite and, in response to the polling request, transmitting the stored data from the central data storage area to the earth-based station via the detected satellite.

8. The system of claim 1 wherein the satellite detection system detects each of the plurality of satellites as each passes within the antenna beam coverage region, the receiver and transmitter terminating communication with the detected satellite when the detected satellite moves out of the antenna beam coverage region, the satellite detection system detecting when a subsequent one of the plurality of satellites passes through the antenna beam coverage region and generating the indicator that the subsequent one of the plurality of satellites has been detected within the antenna beam coverage region, the receiver and transmitter communicating with the subsequent one of the plurality of satellites while the subsequent one of the plurality of satellites is within the antenna beam coverage region.

9. An earth-based satellite communication station for communicating with a plurality of satellites in non-geostationary earth orbits on a temporary communication link wherein the plurality of satellites are distributed in an arrangement with sufficient distances between satellites such that, at times, all satellites are out of range of an antenna beam coverage region of a non-tracking antenna of an earth-based station, the satellite communication station comprising:

a non-adjustable antenna having a fixed aperture with an antenna beam coverage region and aimed at a fixed position relative to the earth-based station;

a satellite detection system to detect when one of the plurality of satellites passes through the antenna beam coverage region;

a receiver coupled to the antenna and receiving radio transmissions from the detected satellite via the temporary communication when the satellite passes through the antenna beam coverage region and not receiving data from any of the plurality of satellites when the detected satellite passes out of the antenna beam coverage region until another one of the plurality of satellites passes through the antenna beam coverage region and is detected by the satellite detection system;

a data storage area to store data for transmission to the detected satellite; and a transmitter coupled to the antenna and transmitting the stored data to the detected satellite when the satellite passes through the antenna beam coverage region and not transmitting to any of the plurality of satellites when the detected satellite passes out of the antenna beam coverage region until another one of the plurality of satellites passes through the antenna beam coverage region and is detected by the satellite detection system.

10. The station of claim 9 wherein the satellite detection system is coupled to the receiver and detects the satellite within the antenna beam coverage region based on a signal strength value indicative of the strength of the received radio transmissions.

11. The station of claim 9, further including an orbital data storage area containing orbital data indicative of satellite orbital positions of the plurality of satellites wherein the satellite detection system determines when the detected satellite is within the antenna beam coverage region based on the orbital data.

12. The station of claim 9, further including a data input device to generate data for storage in the data storage area.

13. The station of claim 9, further including a data input device to generate additional data for transmission by the transmitter to the detected satellite in real-time while the detected satellite is within the antenna beam coverage region.

14. The station of claim 9, further including a polling request system within the earth-based station for transmitting a polling request to the detected satellite using the transmitter.

15. The station of claim 14 wherein the detected satellite, in response to reception of the polling request, transmits data from the satellite to the receiver in the earth-based station.

16. The station of claim 14, further including a central data storage area to store data for the earth-based station, the central data storage area communicating with the detected satellite and, in response to the polling request, transmitting the stored data from the central data storage area to the earth-based station via the detected satellite.

17. The station of claim 9 wherein the satellite detection system detects each of the plurality of satellites as each passes within the antenna beam coverage region, the receiver and transmitter terminating communication with the detected satellite when the detected satellite moves out of the antenna beam coverage region, the satellite detection system detecting when a subsequent one of the plurality of satellites passes through the antenna beam coverage region, the receiver and transmitter communicating with the subsequent one of the plurality of satellites while the subsequent one of the plurality of satellites is within the antenna beam coverage region.

18. An earth-based satellite communication system for communicating with a plurality of satellites in non-geostationary earth orbits wherein the plurality of satellites are distributed in an arrangement with sufficient distances between satellites such that, at times, all satellites are out of range of an antenna beam coverage region of a non-tracking antenna of an earth-based station, the satellite communication system comprising:

a non-adjustable antenna having an antenna aperture with an antenna beam coverage region and aimed at a fixed position relative to the earth-based system;

a satellite detection system to detect when each of the plurality of satellites passes through the antenna beam coverage region;

a receiver coupled to the antenna and receiving radio transmissions from the satellite currently passing through the antenna beam coverage region;

a data storage area to store data for transmission to the satellite passing through the antenna beam coverage region; and a transmitter coupled to the antenna transmitting the stored data to the satellite currently passing through the antenna beam coverage region, the receiver and transmitter communicating with each of the plurality of satellites as each of the satellites are passing through the antenna beam coverage region and not communicating with any of the plurality of satellites when no satellite is passing through the antenna beam coverage region.

19. The system of claim 18 wherein the satellite detection system is coupled to the receiver and detects when each of the satellites passes through the antenna beam coverage region based on a signal strength value indicative of the strength of the received radio transmissions.

20. The system of claim 18, further including an orbital data storage area containing orbital data indicative of satellite orbital positions of the plurality of satellites wherein the satellite detection system determines when each of the satellites passes through the antenna beam coverage region based on the orbital data.

21. The system of claim 18, further including a data input device to generate data for storage in the data storage area.

22. The system of claim 18, further including a data input device to generate additional data for transmission by the transmitter to the satellite currently passing through the antenna beam coverage region in real-time while the detected satellite is within the antenna beam coverage region.

23. The system of claim 18, further including a polling request system within the earth-based system transmitting a polling request to the detected satellite using the transmitter.

24. A method using an earth-based satellite communication system for communicating with a plurality of satellites in non-geostationary earth orbits wherein the plurality of satellites are distributed in an arrangement with sufficient distances between satellites such that, at times, all satellites are out of range of an antenna beam coverage region of a non-tracking antenna of an earth-based station, the method comprising the steps of:

aiming a non-adjustable antenna, having an antenna aperture with an antenna beam coverage region, at a fixed position relative to the earth-based system;

detecting when one of the plurality of satellites passes through the antenna beam coverage region;

storing data prior to detecting when one of the plurality of satellites passes through the antenna beam coverage region;

establishing a temporary communication link with the detected satellite in the antenna beam coverage region to transmit the stored data to the detected satellite via the temporary communication link; and terminating the temporary communication link when the detected satellite passes out of the antenna beam coverage region wherein no communication link exists between the earth-based station and any of the plurality of satellites when the temporary communication link is terminated until one of the plurality of satellites subsequently passes through the antenna beam coverage region and is detected.

25. The method of claim 24 wherein the step of detecting detects when one of the plurality of satellites passes through the antenna beam coverage region based on a signal strength value indicative of the strength of the received radio transmissions.

26. The method of claim 24 wherein the step of detecting detects when one of the plurality of satellites passes through the antenna beam coverage region based on orbital data indicative of satellite orbital positions of the plurality of satellites.

27. The method of claim 24, further including the step of generating data for storage prior to detecting when one of the plurality of satellites passes through the antenna beam coverage region.

28. The method of claim 24, further including the step of generating additional data for transmission to the detected satellite in real-time, the step of transmitting further transmitting the additional data to the detected satellite in real-time while the detected satellite is within the antenna beam coverage region.

29. The method of claim 24, further including the step of transmitting a polling request to the detected satellite wherein the step of receiving receives data transmitted from the satellite in response to reception of the polling request.

30. The method of claim 24, further including the step of transmitting a polling request to the detected satellite wherein the step of receiving receives data transmitted from a central data storage area to the earth-based system via the detected satellite in response to reception of the polling request.

31. The method of claim 24 wherein the step of detecting detects each of the plurality of satellites as each passes within the antenna beam coverage region, the steps of receiving and transmitting temporarily terminating receiving and transmitting when the detected satellite moves out of the antenna beam coverage region and, when the step of detecting detects that a subsequent one of the plurality of satellites is passing through the antenna beam coverage region, subsequently resuming receiving and transmitting while the subsequent one of the plurality of satellites is within the antenna beam coverage region.

32. A method using an earth-based satellite communication station for communicating with a plurality of satellites in non-geostationary earth orbits wherein the plurality of satellites are distributed in an arrangement with sufficient distances between satellites such that, at times, all satellites are out of range of an antenna beam coverage region of a non-tracking antenna of an earth-based station the method comprising the steps of:

aiming a directional antenna with an antenna aperture having an antenna beam coverage region at a fixed azimuth and elevation;

detecting when each of the plurality of satellites sequentially passes through the antenna beam coverage region;

receiving radio transmissions from the satellite currently passing through the antenna beam coverage region;

storing data for transmission to the satellite currently passing through the antenna beam coverage region; and transmitting the stored data to the satellite currently passing through the antenna beam coverage region, the steps of receiving and transmitting communicating with each of the plurality of satellites as each of the satellites are passing through the antenna beam coverage region and not communicating with any of the plurality of satellites when no satellite is passing through the antenna beam coverage region.

33. The method of claim 32 wherein the step of detecting detects when each of the satellites passes through the antenna beam coverage region based on a signal strength value indicative of the strength of the radio transmissions received in the step of receiving.

34. The method of claim 32 wherein the step of detecting detects when each of the satellites passes through the antenna beam coverage region based on orbital data indicative of satellite orbital positions of the plurality of satellites.

35. The method of claim 32, further including the step of generating data for storage in the step of storing.

36. The method of claim 32, further including the step of generating additional data for transmission in real-time to the satellite currently passing through the antenna beam coverage region, the step of transmitting further transmitting the additional data to the satellite currently passing through the antenna beam coverage region while the satellite currently passing through the antenna beam coverage region is within the antenna beam coverage region.

37. The method of claim 32, further including the step of transmitting a polling request to the satellite currently passing through the antenna beam coverage region.

* * * * *